US011873663B2

(12) United States Patent
Zheng et al.

(10) Patent No.: US 11,873,663 B2
(45) Date of Patent: Jan. 16, 2024

(54) DOOR LOCK DEVICE AND DOOR LOCK HAVING THE SAME

(71) Applicant: Smart Electronic Industrial (Dong Guan) Co., Ltd., Dongguan (CN)

(72) Inventors: Li Zheng, Kowloon (HK); Daihua Zhou, Dongguan (CN)

(73) Assignee: Smart Electronic Industrial (Dong Guan) Co., Ltd.

( * ) Notice: Subject to any disclaimer, the term of this patent is extended or adjusted under 35 U.S.C. 154(b) by 179 days.

(21) Appl. No.: 17/504,992

(22) Filed: Oct. 19, 2021

(65) Prior Publication Data

US 2022/0178171 A1 Jun. 9, 2022

(30) Foreign Application Priority Data

Dec. 3, 2020 (CN) ......................... 202022866081.7

(51) Int. Cl.

| | |
|---|---|
| ***E05B 63/14*** | (2006.01) |
| ***E05B 47/00*** | (2006.01) |
| ***E05C 9/04*** | (2006.01) |
| ***E05B 59/00*** | (2006.01) |

(52) U.S. Cl.

CPC ........ *E05B 63/146* (2013.01); *E05B 47/0012* (2013.01); *E05B 59/00* (2013.01); *E05C 9/041* (2013.01); *E05B 2047/002* (2013.01)

(58) Field of Classification Search

CPC ............... E05B 63/146; E05B 47/0012; E05B 2047/002; E05C 9/021; E05C 9/041

USPC .......................................................... 292/340

See application file for complete search history.

(56) References Cited

U.S. PATENT DOCUMENTS

| | | | | |
|---|---|---|---|---|
| 4,606,203 A * | 8/1986 | Esser | ...................... E05B 59/00 | 70/462 |
| 5,707,090 A * | 1/1998 | Sedley | ................ E05B 47/0043 | 292/172 |
| 6,758,070 B2 * | 7/2004 | Yu | ......................... E05B 47/068 | 292/144 |

(Continued)

FOREIGN PATENT DOCUMENTS

| | | | |
|---|---|---|---|
| CN | 105735745 A * | 7/2016 | ............... E05B 3/00 |
| CN | 208363840 U * | 1/2019 | |

(Continued)

*Primary Examiner* — Kristina R Fulton
*Assistant Examiner* — James Edward Ignaczewski
(74) *Attorney, Agent, or Firm* — Lerner David LLP

(57) ABSTRACT

A door lock device and a door lock having the same, wherein the door lock device includes: a switch mechanism capable of being operatively switched from a first position to a second position or a third position; an oblique tongue mechanism, including an oblique tongue body and an oblique tongue drive assembly, the oblique tongue drive assembly being connected to the switch mechanism, wherein, when the switch mechanism is in the first position, the oblique tongue body is in an extended state, and when the switch mechanism is switched from the first position to the second position or the third position, the switch mechanism drives the oblique tongue drive assembly, to drive the oblique tongue body to be in a retracted state; a deadbolt mechanism, including a deadbolt body and a deadbolt drive assembly; and a linkage mechanism connecting the switch mechanism and the deadbolt drive assembly.

10 Claims, 7 Drawing Sheets

(56) References Cited

U.S. PATENT DOCUMENTS

| | | | | | |
|---|---|---|---|---|---|
| 7,363,784 | B2 * | 4/2008 | Shvarts | E05B 59/00 | 292/172 |
| 11,661,763 | B2 * | 5/2023 | Qiu | E05B 3/003 | 292/39 |
| 2002/0104339 | A1 * | 8/2002 | Saner | E05C 9/026 | 70/108 |
| 2018/0187454 | A1 * | 7/2018 | Moon | E05B 59/00 | |
| 2019/0071902 | A1 * | 3/2019 | Uyeda | E05B 17/2038 | |
| 2021/0277684 | A1 * | 9/2021 | Moon | E05B 55/005 | |

FOREIGN PATENT DOCUMENTS

| | | | | |
|---|---|---|---|---|
| CN | 208363840 | U | | 1/2019 |
| CN | 110541618 | A | * | 12/2019 |

* cited by examiner

DOOR LOCK DEVICE AND DOOR LOCK HAVING THE SAME

CROSS-REFERENCE TO RELATED APPLICATIONS

This application claims priority from Chinese patent application number 202022866081.7, filed Dec. 3, 2020, the disclosure of which is hereby incorporated herein by reference.

FIELD OF THE DISCLOSURE

The present disclosure relates to the field of door locks, in particular to a door lock device and a door lock having the same.

BACKGROUND

In smart electronic door locks, the deadbolt lock body is usually not provided, and only the oblique tongue lock body is used, thereby reducing the safety factor and experience of the user.

SUMMARY OF THE DISCLOSURE

The present disclosure aims to solve at least one of the technical problems existing in the prior art. Accordingly, the present disclosure provides a door lock device, which can meet the demand, so that when the user switches to use a smart electronic lock, the deadbolt lock body can be maintained, thereby improving the safety factor and user experience.

The present disclosure also provides a door lock with the above-mentioned door lock device.

A door lock device according to an embodiment of a first aspect of the present disclosure includes:

a switch mechanism capable of being operatively switched from a first position to a second position or a third position;

an oblique tongue mechanism, including an oblique tongue body and an oblique tongue drive assembly, the oblique tongue drive assembly being connected to the switch mechanism, wherein, when the switch mechanism is in the first position, the oblique tongue body is in an extended state, and when the switch mechanism is switched from the first position to the second position or the third position, the switch mechanism drives the oblique tongue drive assembly, thereby driving the oblique tongue body to be in a retracted state;

a deadbolt mechanism, including a deadbolt body and a deadbolt drive assembly; and a linkage mechanism connecting the switch mechanism and the deadbolt drive assembly, wherein, when the switch mechanism is switched from the first position to the second position and the deadbolt body is in the retracted state, the linkage mechanism is adapted to cooperate with the deadbolt drive assembly to drive the deadbolt body to be in the extended state; when the switch mechanism is switched from the first position to the third position and the deadbolt body is in the extended state, the linkage mechanism is adapted to cooperate with the deadbolt drive assembly to drive the deadbolt body to be in the retracted state; and when the switch mechanism is switched from the second position or the third position to the first position, the linkage mechanism is disengaged from the deadbolt drive assembly.

The door lock device according to the embodiment of the present disclosure has at least the following beneficial effects: it employs a linkage mechanism to link the oblique tongue drive assembly with the deadbolt drive assembly, so that when the user adopts a smart electronic lock, the deadbolt lock body can be retained, and the safety factor and experience are improved. At the same time, the deadbolt mechanism is linked with the oblique tongue mechanism, and no other driving components need to be added. Therefore, the structure of the disclosure is simple and easy to use.

According to some embodiments of the present disclosure, the linkage mechanism includes:

a first gear;

a rotary head disposed in a movable cavity of the first gear, and capable of rotating within the movable cavity in a preset range;

a first drive shaft, one end of which is connected to the switch mechanism, and the other end thereof passes through the rotary head to connect with the oblique tongue drive assembly;

a second gear;

a rack, one end of which meshes with the first gear, and the other end thereof meshes with the second gear; and a second drive shaft, one end of which is connected to the second gear, and the other end thereof is connected to the deadbolt drive assembly.

According to some embodiments of the present disclosure, the movable cavity includes a pair of radially symmetric first movable sub-cavities and a pair of radially symmetric second movable sub-cavities. Each first movable sub-cavity includes a first planar inner wall, a second planar inner wall, and an arc-shaped inner wall connecting the first planar inner wall and the second planar inner wall, the three walls being sequentially arranged in a clockwise direction. Each second movable sub-cavity includes a first planar inner wall, a second planar inner wall, and an arc-shaped inner wall connecting the first planar inner wall and the second planar inner wall, the three walls being sequentially arranged in a clockwise direction. The first planar inner wall of each first movable sub-cavity is connected to the second planar inner wall of an adjacent second movable sub-cavity upon defining a first obtuse angle therebetween, the second planar inner wall of the first movable sub-cavity is connected to the first planar inner wall of an adjacent second movable sub-cavity upon defining a second obtuse angle therebetween, and the first obtuse angle is the same as the second obtuse angle. The first planar inner wall of each first movable sub-cavity is parallel to the first planar inner wall of the other first movable sub-cavity, the second plane inner wall of each first movable sub-cavity is parallel to the second plane inner wall of the other first movable sub-cavity, the first planar inner wall of each second movable sub-cavity is parallel to the first planar inner wall of the other second movable sub-cavity, and the second planar inner wall of each second movable sub-cavity is parallel to the second planar inner wall of the other second movable sub-cavity. The rotary head is configured to: four outer walls of the rotary head respectively are pressed against the two second planar inner walls of the two first movable sub-cavities and two second planar inner walls of the two second movable sub-cavities; when the rotary head rotates in the clockwise direction, the four outer walls of the rotary head respectively rotate in the clockwise direction to generate thrust on the corresponding four second planar inner walls, thereby driving the first gear and the rotary head to rotate synchronously at a certain angle; when the rotary head rotates in a counter clockwise direction, the rotary head is out of contact with the two second planar inner walls of the two first movable sub-cavities and the two second planar inner walls of the two second movable sub-cavities, then the rotary head rotates in the counter clockwise direction relative to the first gear, and during the rotation, after the four outer walls of the rotary head are pressed against the corresponding four first planar inner walls respectively, the above-mentioned relative rotation is stopped.

According to some embodiments of the present disclosure, the door lock device further includes:

- a first return block coaxially fixed to the second gear and provided with a first protrusion; and
- a first pushing plate elastically pressed against the first protrusion,
- wherein, when the deadbolt body is in the extended state, the first protrusion is pressed by the first pushing plate to be in a first holding position, and when the deadbolt body is in the retracted state, the first protrusion is pressed by the first pushing plate to be in a second holding position.

According to some embodiments of the present disclosure, the first protrusion has two intersecting first pressing surfaces, and the first pushing plate has a first pushing surface that cooperates with the first pressing surfaces.

According to some embodiments of the present disclosure, the door lock device further includes:

- a second pushing plate;
- a third gear meshed with the rack; and
- a second return block coaxially fixed to the third gear,
- wherein, the second return block is provided with a second protrusion, and the second push plate elastically presses the second protrusion; the second protrusion has two intersecting second pressing surfaces, and the second pushing plate has a second pushing surface that is matched with the second pressing surfaces,
- when the deadbolt body is in the extended state, the second protrusion is pressed by the second pushing plate to be in a third holding position; and when the deadbolt body is in the retracted state, the second protrusion is pressed by the second pushing plate to be in a fourth holding position.

According to some embodiments of the present disclosure, one end of the first pushing plate facing away from the first pushing surface is connected to a first holding spring, and one end of the second pushing plate facing away from the second pushing surface is connected to a second holding spring.

According to some embodiments of the present disclosure, the door lock device further includes a housing which covers the linkage mechanism and is fixed to a door panel by screws.

According to some embodiments of the present disclosure, the switch mechanism is a door handle, one end of the first drive shaft is connected to the door handle, and the other end thereof passes through the rotary head and is connected to the oblique tongue drive assembly.

A door lock according to an embodiment of a second aspect of the present disclosure includes the door lock device according to the embodiments of the first aspect of the present disclosure.

The door lock according to the embodiment of the second aspect of the present disclosure has at least the following beneficial effects: it adopts a linkage mechanism to link the oblique tongue drive assembly and the deadbolt drive assembly, so that when the user adopts a smart electronic lock, the deadbolt lock body can be maintained, and the safety factor and experience are improved. At the same time, the deadbolt mechanism and the oblique tongue mechanism are linked without additional driving components. The disclosure has a simple structure and is easy to use.

BRIEF DESCRIPTION OF THE DRAWINGS

The above and or additional aspects and advantages of the present disclosure will become obvious and easy to understand from the description of the embodiments in conjunction with the following drawings, in which.

REFERENCE NUMERALS

Figure 1:
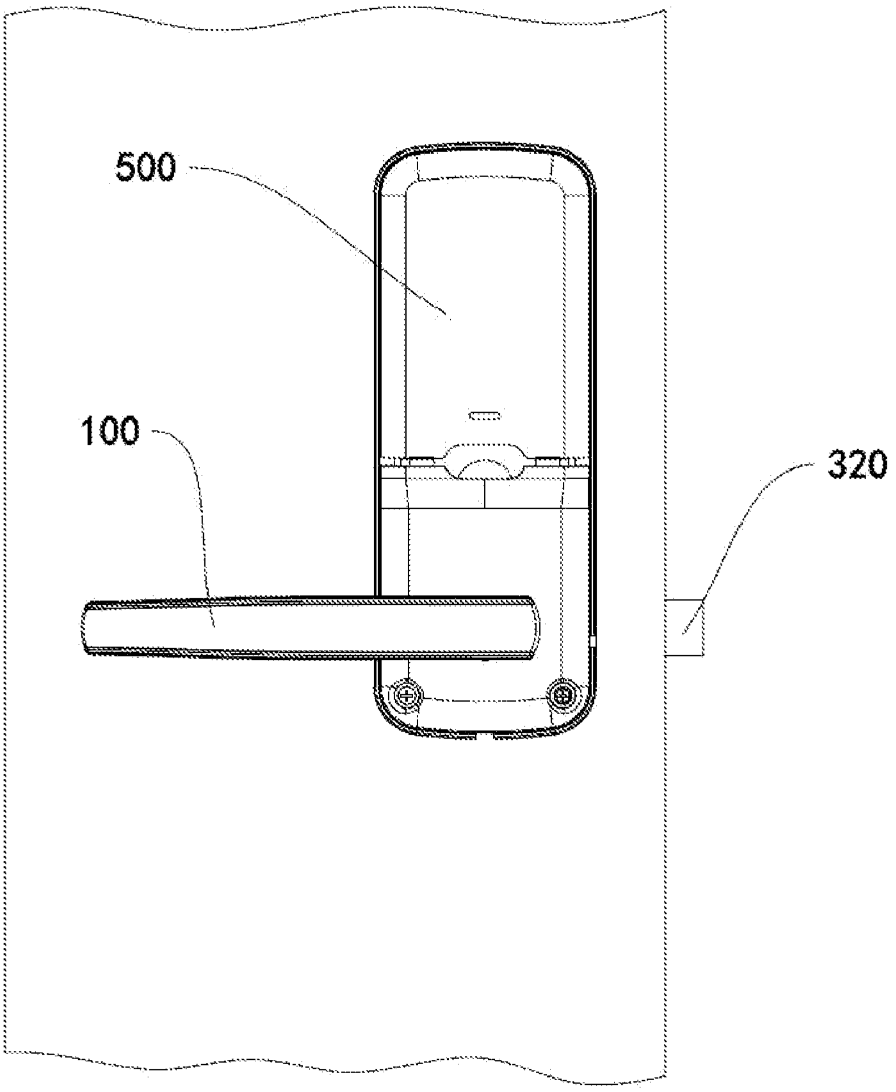
FIG. 1 is a schematic diagram of a door lock installed on a door panel according to an embodiment of the present disclosure.

Door handle 100, first drive shaft 210, first gear 220, rotary head 221, movable cavity 222, first movable sub-cavity 2221, second movable sub-cavity 2222, first planar inner wall 22211, second planar inner wall 22212, arc-shaped inner wall 22213, first planar inner wall 22221, second planar inner wall 22222, arc-shaped inner wall 22223, rack 230, first return block 241, second gear 242, first protrusion 243, first pressing surface 2431, second drive shaft 244, first pushing plate 245, first pushing surface 2451, first holding spring 246, second return block 251, second protrusion 253, second pushing plate 254, second holding spring 255, oblique tongue drive assembly 310, oblique tongue body 320, deadbolt drive assembly 410, and deadbolt body 420, and housing 500.

DETAILED DESCRIPTION

The embodiments of the present disclosure are described in detail below. Examples of the embodiments are shown in the accompanying drawings, in which the same or similar reference numerals indicate the same or similar elements or elements with the same or similar functions. The embodiments described below with reference to the accompanying drawings are exemplary, and are only used to explain the present disclosure, but should not be understood as limiting the present disclosure.

In the description of the present disclosure, it should be understood that the orientation or positional relationship involved in the orientation description, such as up, down, front, back, left, right, is based on the orientation or positional relationship shown in the drawings, and it is only for the convenience of describing the present disclosure and simplifying the description, rather than indicating or implying that the device or element referred to must have a specific orientation, be constructed and operated in a specific orientation, and therefore cannot be understood as a limitation of the present disclosure.

In the description of the present disclosure, "plurality" means two or more, and greater than, less than, and exceeding should be understood as not including the number to which they are described relatively, and the above, below, and within should be understood as including the number to which they are described relatively. The first and second described in the text are only used to distinguish technical features, and cannot be understood as indicating or implying relative importance or implicitly indicating the number of the indicated technical features or implicitly indicating the order of the indicated technical features.

In the description of the present disclosure, unless clearly defined otherwise, terms such as setting, installation, and connection should be understood in a broad sense, and those skilled in the art can reasonably determine the specific meaning of the above terms in the present disclosure in combination with the specific content of the technical solution.

With reference to FIGS. 3 to 7, a door lock device according to an embodiment of a first aspect of the present disclosure includes:

- a switch mechanism capable of being operatively switched from a first position to a second position or a third position;
- an oblique tongue mechanism, including an oblique tongue body 320 and an oblique tongue drive assembly 310, the oblique tongue drive assembly 310 being connected to the switch mechanism, wherein, when the switch mechanism is in the first position, the oblique tongue body 320 is in an extended state, and when the switch mechanism is switched from the first position to the second position or the third position, the switch mechanism drives the oblique tongue drive assembly 310, thereby driving the oblique tongue body 320 to be in a retracted state;
- a deadbolt mechanism, including a deadbolt body 420 and a deadbolt drive assembly 410; and
- a linkage mechanism connecting the switch mechanism and the deadbolt drive assembly 410.

Here, when the switch mechanism is switched from the first position to the second position and the deadbolt body 420 is in the retracted state, the linkage mechanism is adapted to cooperate with the deadbolt drive assembly 410 to drive the deadbolt body 420 to be in the extended state;

When the switch mechanism is switched from the first position to the third position and the deadbolt body 420 is in the extended state, the linkage mechanism is adapted to cooperate with the deadbolt drive assembly 410 to drive the deadbolt body 420 to be in the retracted state; and when the switch mechanism is switched from the second position or the third position to the first position, the linkage mechanism is disengaged from the deadbolt drive assembly 410.

The present disclosure employs a linkage mechanism to link the oblique tongue drive assembly 310 with the deadbolt drive assembly 410, so that when the user adopts a smart electronic lock, the deadbolt lock body can be retained, and the safety factor and experience are improved. At the same time, the deadbolt mechanism is linked with the oblique tongue mechanism, and no other driving components need to be added. Therefore, the structure of the disclosure is simple and easy to use.

Figure 3:
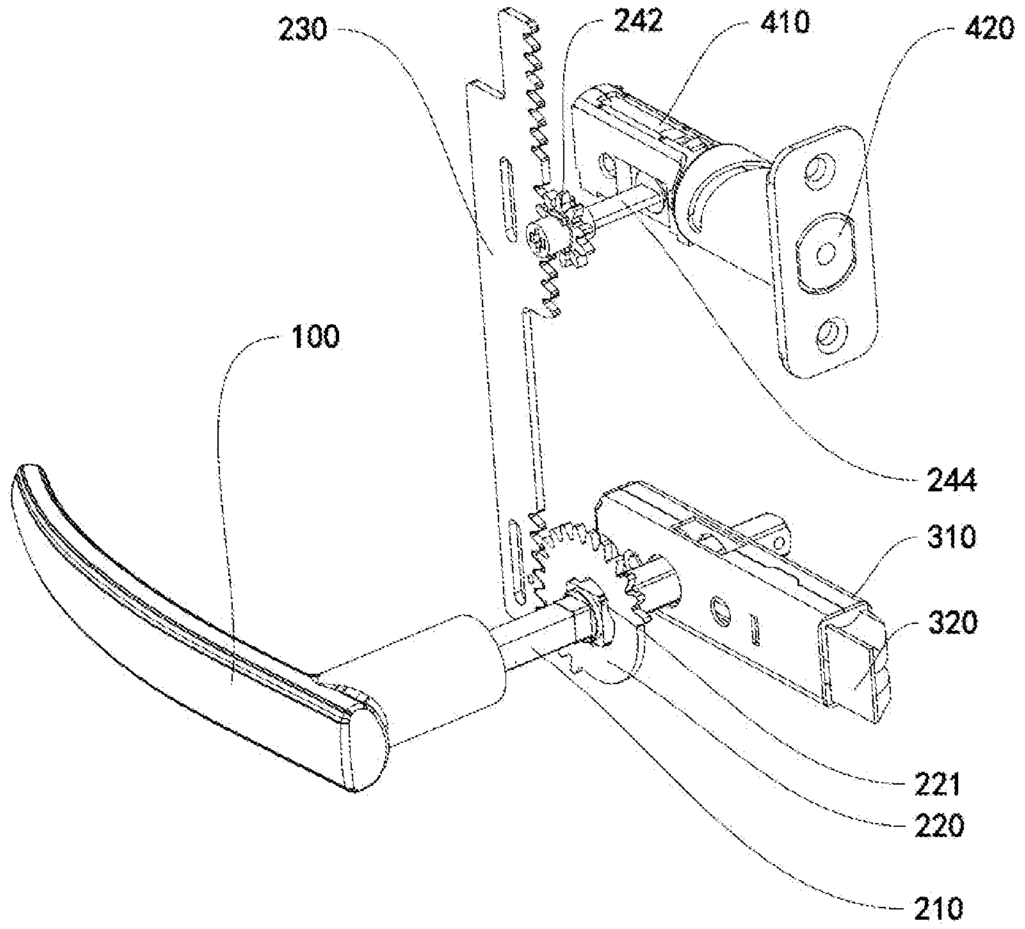
FIG. 3 is a schematic diagram of a switch mechanism, a linkage mechanism, an oblique tongue mechanism and a deadbolt mechanism of an embodiment of the present disclosure.
Figure 4:
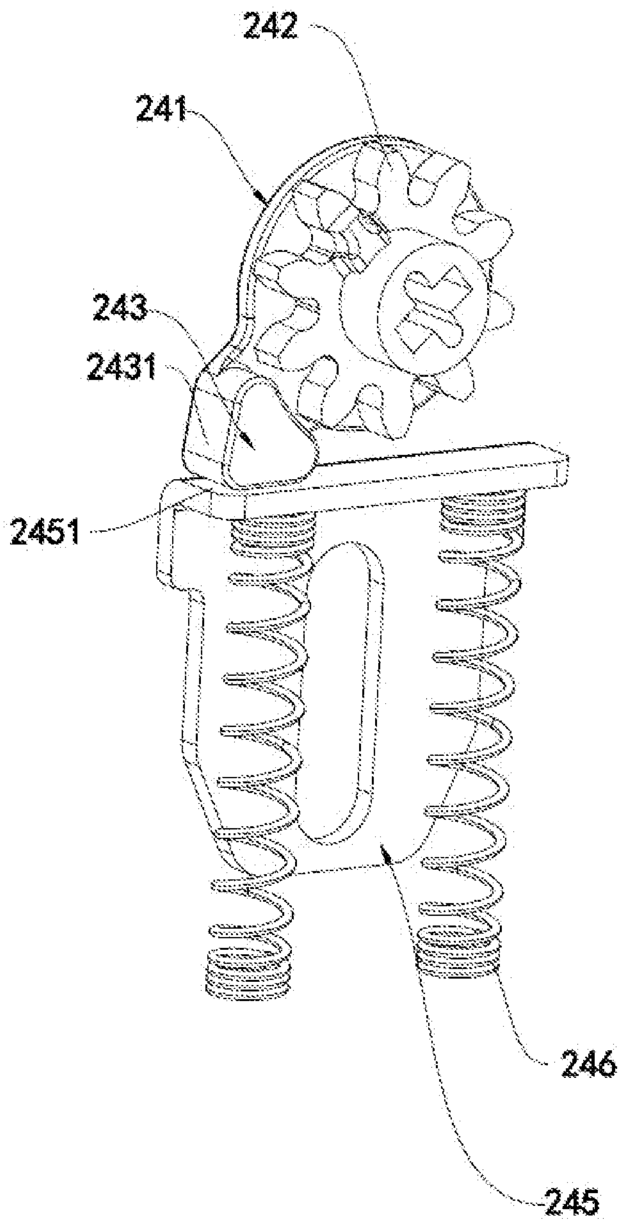
FIG. 4 is a schematic diagram of a first return block, a second gear, a first pushing plate and a first holding spring according to an embodiment of the present disclosure.
Figure 5:
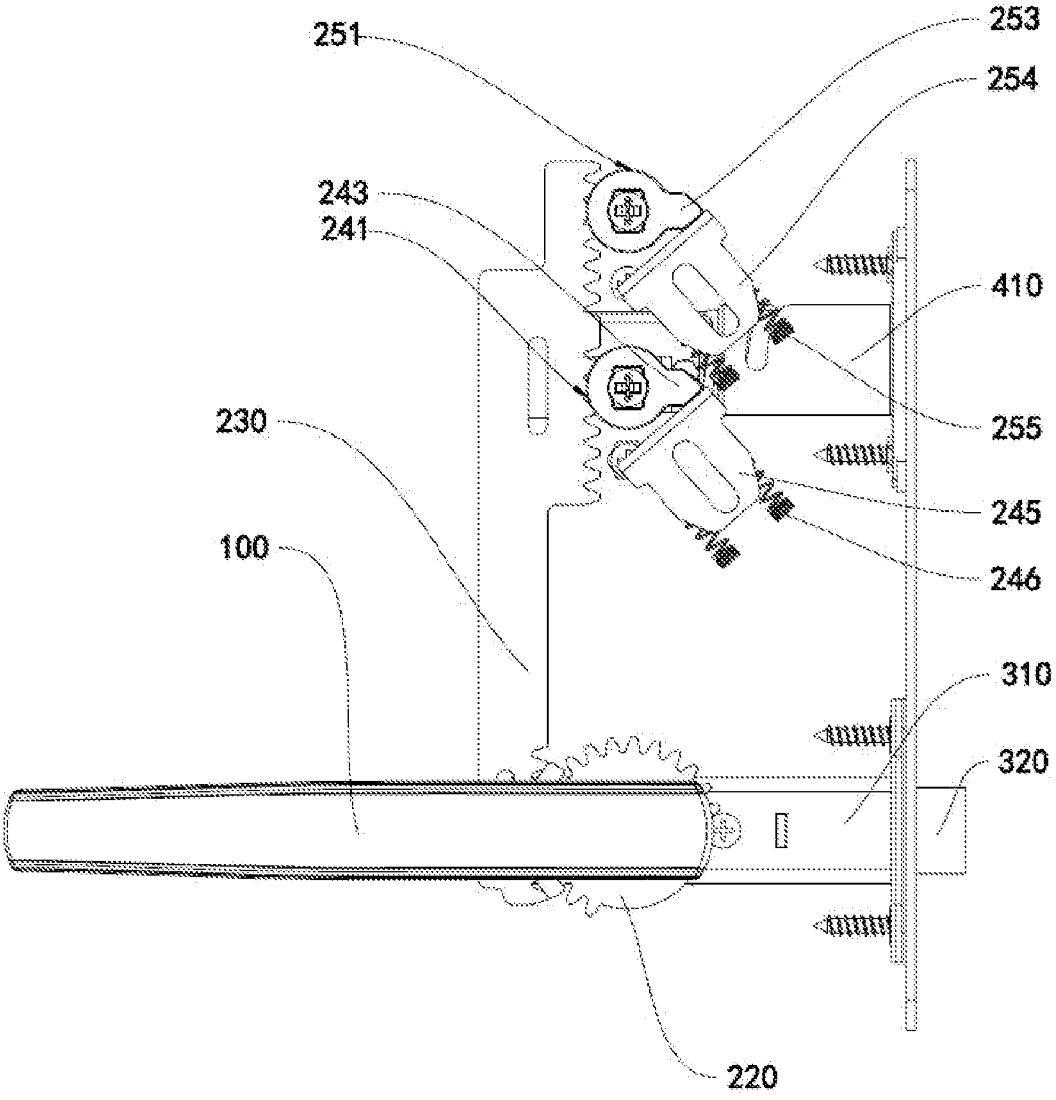
FIG. 5 is a structural diagram of a door lock device when the switch mechanism of the embodiment of the present disclosure is in a first position.
Figure 6:
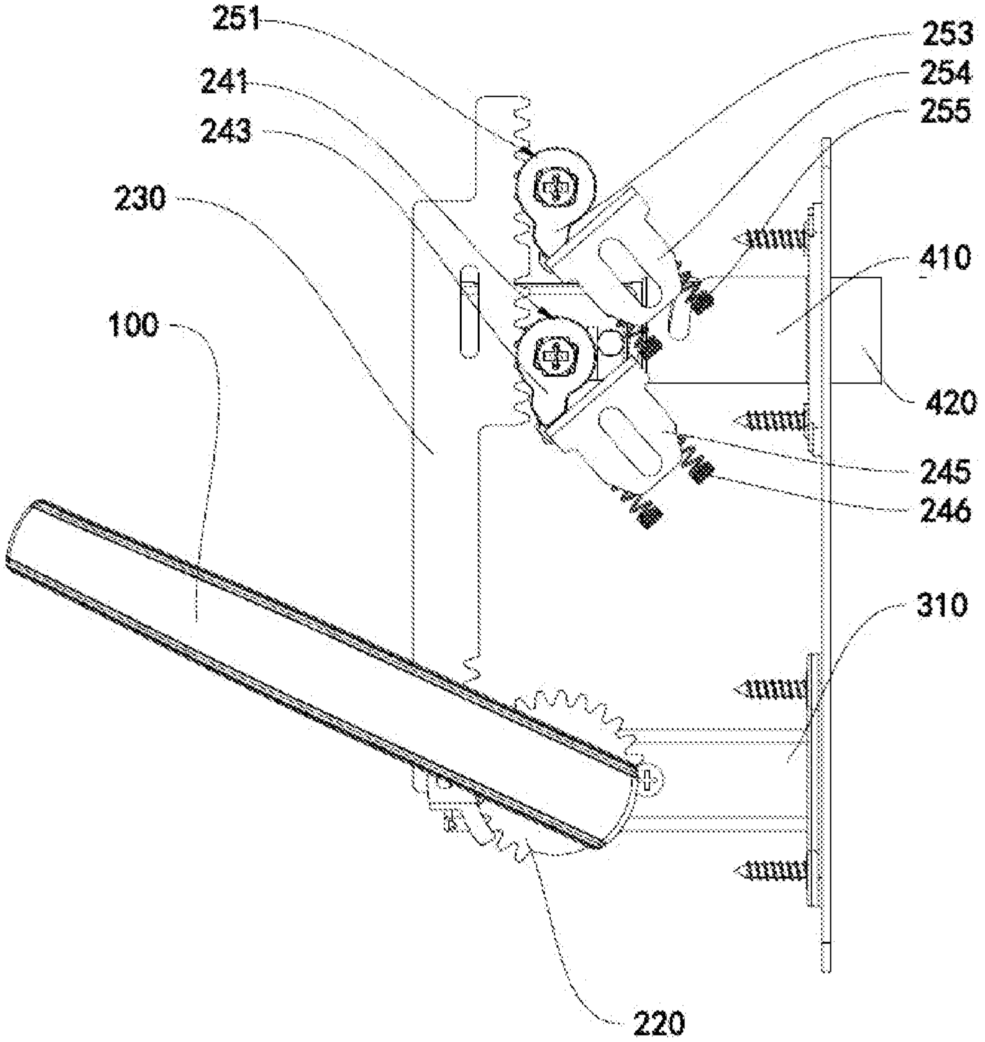
FIG. 6 is a structural diagram of a door lock device when the switch mechanism of the embodiment of the present disclosure is in a second position.
Figure 7:
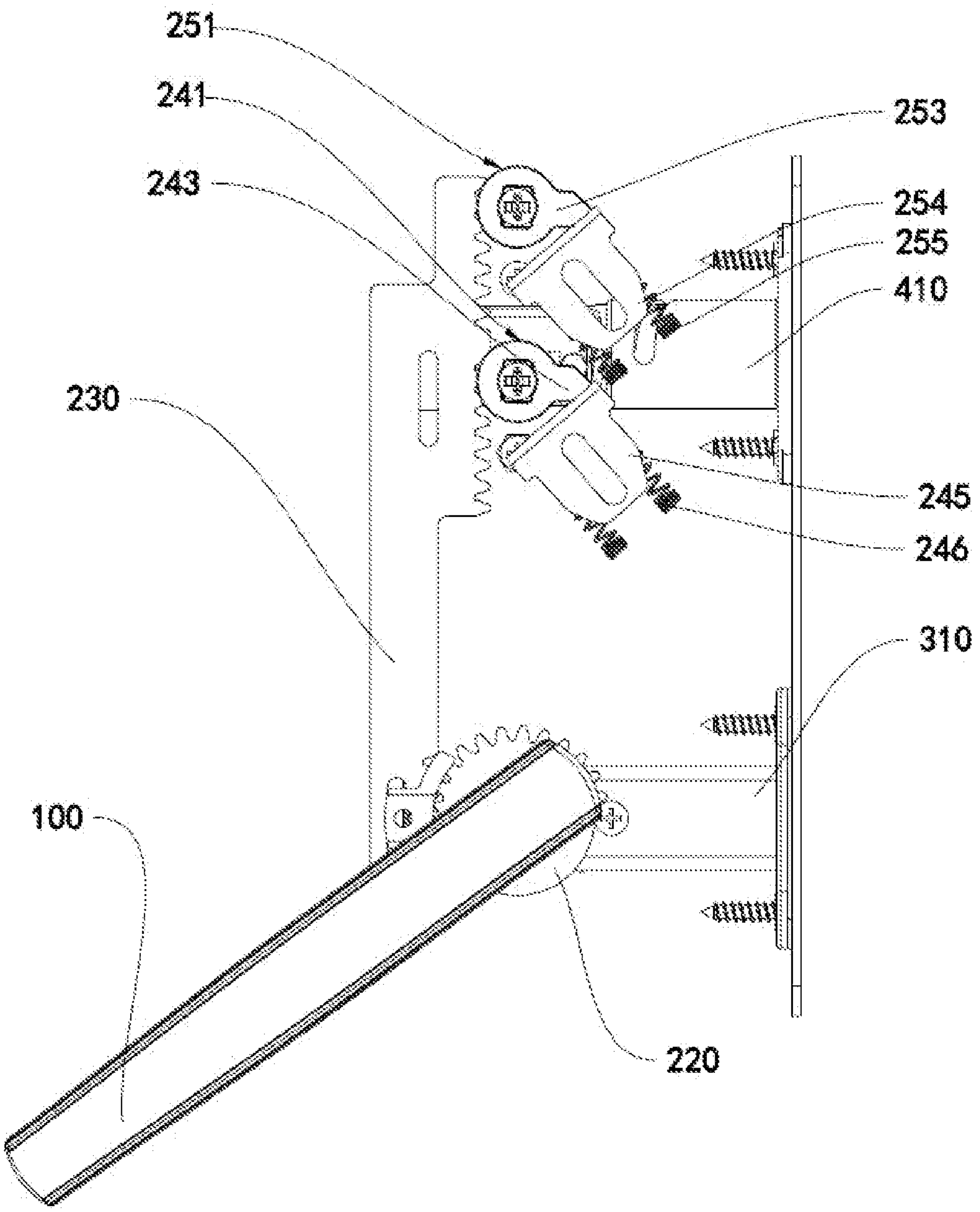
FIG. 7 is a structural diagram of a door lock device when the switch mechanism of the embodiment of the present disclosure is in a third position.

Referring to FIGS. 3-5, in some specific embodiments of the present disclosure, the linkage mechanism includes:

- a first gear 220;
- a rotary head 221 disposed in a movable cavity 222 of the first gear 220, and capable of rotating within the movable cavity 222 in a preset range;
- a first drive shaft 210, one end of which is connected to the switch mechanism, and the other end thereof passes through the rotary head 221 to connect with the oblique tongue drive assembly 310;
- a second gear 242;
- a rack 230, one end of which meshes with the first gear 220, and the other end thereof meshes with the second gear 242; and
- a second drive shaft 244, one end of which is connected to the second gear 242, and the other end thereof is connected to the deadbolt drive assembly 410.

Here, when the switch mechanism drives the first drive shaft 210 to rotate, the oblique tongue body 320 can be extended or retracted through the oblique tongue drive device. The first drive shaft 210 passes through the rotary head 221 and can be rotated, and the rotary head 221 is disposed in the movable cavity 222 of the first gear 220. As the rotary head 221 and the first gear 220 are rotatably matched, the rotary head 221 can drive the first gear 220, so that the first gear 220 and the rotary head 221 can rotate synchronously. Alternatively, the rotary head 221 can rotate within the movable cavity 222 of the first gear 220 in a preset range, so that the rack 230 meshed with the first gear 220 moves up and down, or the rotary head 221 rotates and the first gear 220 does not rotate.

Specifically, the movable cavity 222 includes a pair of radially symmetrical first movable sub-cavities 2221 and a pair of radially symmetrical second movable sub-cavities 2222. Each first movable sub-cavity 2221 includes a first planar inner wall 22211, a second planar inner wall 22212, and an arc-shaped inner wall 22213 connecting the first planar inner wall 22211 and the second planar inner wall 22212, the three walls being sequentially arranged in a clockwise direction. Each second movable sub-cavity 2222 includes a first planar inner wall 22221, a second planar inner wall 22222, and an arc-shaped inner wall 22223 connecting the first planar inner wall 22221 and the second planar inner wall 22222, the three walls being sequentially arranged in a clockwise direction. A first planar inner wall 22211 of each first movable sub-cavity 2221 is connected to a second planar inner wall 22222 of an adjacent second movable sub-cavity 2222 upon defining a first obtuse angle therebetween. A second planar inner wall 22212 of the first movable sub-cavity 2221 is connected to a first planar inner wall 22221 of an adjacent second movable sub-cavity 2222 upon defining a second obtuse angle therebetween. The first obtuse angle is the same as the second obtuse angle. The first planar inner wall 22211 of each first movable sub-cavity 2221 is parallel to the first planar inner wall 22211 of the other first movable sub-cavity 2221, and the second planar inner wall 22212 of each first movable sub-cavity 2221 is parallel to the second plane inner wall 22212 of the other first movable sub-cavity 2221. The first planar inner wall 22221 of each second movable sub-cavity 2222 is parallel to the first planar inner wall 22221 of another second movable sub-cavity 2222, and the second planar inner wall 22222 of each second movable sub-cavity 2222 is parallel to the second planar inner wall 22222 of the other second movable sub-cavity 2222.

Figure 2:
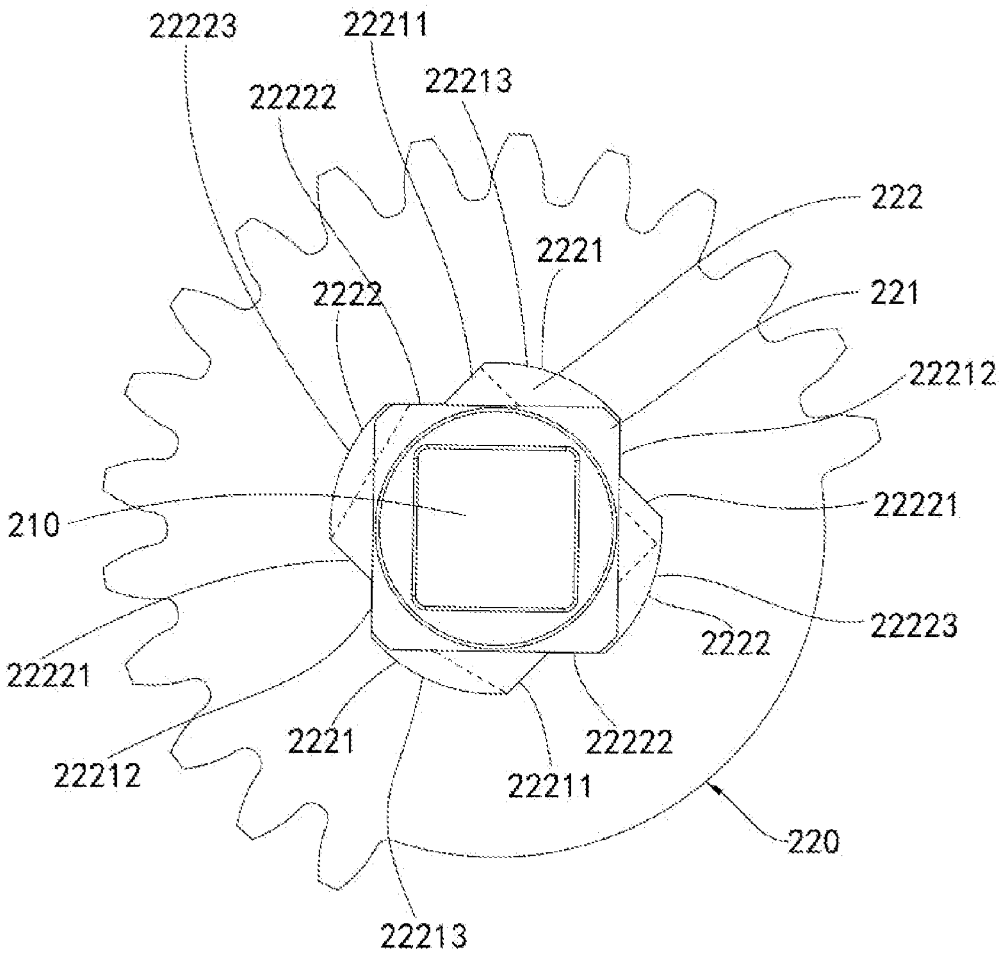
FIG. 2 is a schematic diagram of a first gear and a rotary head according to an embodiment of the present disclosure.

As shown in FIG. 2, in an initial state, four outer walls of the rotary head 221 are respectively pressed against the two second planar inner walls 22212 and two second planar inner walls 22222. when the rotary head 221 rotates in the clockwise direction, the four outer walls of the rotary head 221 respectively rotate in the clockwise direction to generate thrust on the corresponding two second planar inner walls 22212 and two second planar inner walls 22222, thereby driving the first gear 220 and the rotary head 221 to rotate synchronously at a certain angle. Therefore, when the first drive shaft 210 rotates in different directions, the respective components can be moved separately, and the telescopic requirements of the oblique tongue and the deadbolt in the present disclosure can be realized. When the rotary head 221 is rotated in a counter clockwise direction in the initial state, the rotary head 221 is out of contact with the corresponding two second planar inner walls 22212 and two second planar inner walls 22222. Then the rotary head 221 rotates in the counter clockwise direction relative to the first gear 220. During the rotation, when the four outer walls of the rotary head 221 are respectively pressed against the corresponding two first planar inner walls 22211 and the two first planar inner walls 22221, the above-mentioned relative rotation is stopped.

Preferably, the first planar inner wall 22211 of each first movable sub-cavity 2221 is perpendicular to the first planar inner wall 22221 of each second movable sub-cavity 2222. The second planar inner wall 22212 of each first movable sub-cavity 2221 is perpendicular to the second planar inner wall 22222 of each second movable sub-cavity 2222.

Further, when the rack 230 moves up and down, the second gear 242 can rotate in different directions, so that the second drive shaft 244 connected to the second gear 242 also rotates in different directions. Thus, the deadbolt drive assembly 410 drives the deadbolt body 420 to extend or retract.

With reference to FIGS. 3-5, in some specific embodiments of the present disclosure, the door lock device further includes:

- a first return block 241 coaxially fixed to the second gear 242, the first return block 241 being provided with a first protrusion 243;
- a first pushing plate 245 elastically pressed against the first protrusion 243,
- wherein, when the deadbolt body 420 is in the extended state, the first protrusion 243 is pressed by the first pushing plate 245 to be in a first holding position, and when the deadbolt body 420 is in the retracted state, the first protrusion 243 is pressed by the first pushing plate 245 to be in a second holding position.

The first protrusion 243 and the first pushing plate 245 are pressed against each other, so that after the action of each mechanism in the door lock device is completed, and when the deadbolt body 420 is in the extended or retracted state, the first protrusion 243 and the first pushing plate 245 cooperates with each other, such that various mechanisms are kept in a fixed state to avoid abnormalities when the deadbolt body is extended or retracted.

With reference to FIG. 4, in some specific embodiments of the present disclosure, the first protrusion 243 has two intersecting first pressing surfaces 2431, and the first pushing plate 245 has a first pushing surface 2451 that cooperates with the first pressing surfaces 2431. The first pushing surface 2451 presses against the two first pressing surfaces 2431 respectively, to provide a pushing force to the first return block 241 to ensure that the deadbolt body 420 is normally extended or retracted.

Referring to FIG. 5, in some specific embodiments of the present disclosure, the door lock device further includes:

- a second pushing plate 254;
- a third gear meshed with the rack 230; and
- a second return block 251 coaxially fixed to the third gear.

The second return block 251 is provided with a second protrusion 253, and the second push plate 254 elastically presses the second protrusion 253. The second protrusion 253 has two intersecting second pressing surfaces, and the second pushing plate 254 has a second pushing surface that is matched with the second pressing surfaces.

Here, when the deadbolt body 420 is in the extended state, the second protrusion 253 is pressed by the second pushing plate 254 to be in a third holding position; and when the deadbolt body 420 is in the retracted state, the second protrusion 253 is pressed by the second pushing plate 254 to be in a fourth holding position. The second return block 251 has the same function as the first return block 241, and the addition of the above-mentioned components can strengthen the function of holding the above-mentioned components in place. Further, it is ensured that the deadbolt body 420 is normally extended or retracted.

Referring to FIGS. 4-5, in some specific embodiments of the present disclosure, one end of the first pushing plate 245 facing away from the first pushing surface 2451 is connected to a first holding spring 246, and one end of the second pushing plate 254 facing away from the second pushing surface is connected with a second holding spring 255. It is understandable that a torsion spring can also be provided at the first return block 241 to achieve a similar effect, and it is not limited thereto.

With reference to FIG. 1, in some specific embodiments of the present disclosure, a housing 500 is further included. The housing 500 covers the linkage mechanism and is fixed to the door panel by screws. The housing 500 can also be fixed to the door panel by welding or clamping, and it is not limited thereto.

Referring to FIG. 1, in some specific embodiments of the present disclosure, the switch mechanism is a door handle 100. One end of the first drive shaft 210 is connected to the door handle 100, and the other end thereof passes through the rotary head 221 and is connected to the oblique tongue drive assembly 310. It can be understood that the switch mechanism can also be provided in a manner such as an electric drive, so as to be linked with the first drive shaft 210, and it is not limited to this structure.

Referring to FIG. 1, a door lock according to an embodiment of a second aspect of the present disclosure includes the door lock device according to the embodiments of the first aspect of the present disclosure. In the door lock, by adopting the above-mentioned door lock device, when the user adopts a smart electronic lock, the deadbolt lock body can be retained, and the safety factor and experience can be improved. At the same time, the deadbolt mechanism and the oblique tongue mechanism are linked without additional driving components. The disclosure has a simple structure and is easy to use.

The embodiments of the present disclosure are described in detail above with reference to the accompanying drawings, but the present disclosure is not limited to the above-mentioned embodiments. Within the scope of knowledge possessed by a person of ordinary skill in the technical field, various changes can also be made without departing from the purpose of the present disclosure.

Hereinafter, referring to FIGS. 1 to 7, a specific embodiment is used to describe in detail the door lock device according to the embodiment of the present disclosure and the door lock having the same. The following description is only an exemplary description, rather than a specific limitation to the disclosure.

A door lock device includes:

- a switch mechanism capable of being operatively switched from a first position to a second position or a third position;
- an oblique tongue mechanism, including an oblique tongue body 320 and an oblique tongue drive assembly 310, the oblique tongue drive assembly 310 being connected to the switch mechanism, wherein, when the switch mechanism is in the first position, the oblique tongue body 320 is in an extended state, and when the switch mechanism is switched from the first position to the second position or the third position, the switch mechanism drives the oblique tongue drive assembly 310, thereby driving the oblique tongue body 320 to be in a retracted state;
- a deadbolt mechanism, including a deadbolt body 420 and a deadbolt drive assembly 410; and
- a linkage mechanism connecting the switch mechanism and the tongue drive assembly 410.

Here, when the switch mechanism is switched from the first position to the second position and the deadbolt body 420 is in the retracted state, the linkage mechanism is adapted to cooperate with the deadbolt drive assembly 410 to drive the deadbolt body 420 to be in the extended state. When the switch mechanism is switched from the first position to the third position and the deadbolt body 420 is in the extended state, the linkage mechanism is adapted to cooperate with the deadbolt drive assembly 410 to drive the deadbolt body 420 to be in the retracted state; and when the switch mechanism is switched from the second position or the third position to the first position, the linkage mechanism is disengaged from the deadbolt drive assembly 410.

The linkage mechanism includes:

- a first gear 220;
- a rotary head 221 disposed in a movable cavity 222 of the first gear 220, and capable of rotating within the movable cavity 222 in a preset range;
- a first drive shaft 210, one end of which is connected to the switch mechanism, and the other end thereof passes through the rotary head 221 to connect with the oblique tongue drive assembly 310;
- a second gear 242;
- a rack 230, one end of which meshes with the first gear 220, and the other end thereof meshes with the second gear 242; and
- a second drive shaft 244, one end of which is connected to the second gear 242, and the other end thereof is connected to the deadbolt drive assembly 410.

The door lock device further includes:

- a first return block 241 coaxially fixed to the second gear 242, the first return block 241 being provided with a first protrusion 243; and
- a first pushing plate 245 elastically pressed against the first protrusion 243.

When the deadbolt body 420 is in the extended state, the first protrusion 243 is pressed by the first pushing plate 245 to be in a first holding position, and when the deadbolt body 420 is in the retracted state, the first protrusion 243 is pressed by the first pushing plate 245 to be in a second holding position.

The first protrusion 243 has two intersecting first pressing surfaces 2431, and the first pushing plate 245 has a first pushing surface 2451 that cooperates with the first pressing surfaces 2431.

The door lock device further includes:

- a second pushing plate 254;
- a third gear meshed with the rack 230; and
- a second return block 251 coaxially fixed to the third gear.

The second return block 251 is provided with a second protrusion 253, and the second push plate 254 elastically presses the second protrusion 253. The second protrusion 253 has two intersecting second pressing surfaces, and the second pushing plate 254 has a second pushing surface that is matched with the second pressing surfaces.

Here, when the deadbolt body 420 is in the extended state, the second protrusion 253 is pressed by the second pushing plate 254 to be in a third holding position; and when the deadbolt body 420 is in the retracted state, the second protrusion 253 is pressed by the second pushing plate 254 to be in a fourth holding position.

One end of the first pushing plate 245 facing away from the first pushing surface 2451 is connected to a first holding spring 246, and one end of the second pushing plate 254 facing away from the second pushing surface is connected with a second holding spring 255.

A housing 500 is further included. The housing 500 covers the linkage mechanism and is fixed to the door panel by screws. The switch mechanism is a door handle 100. One end of the first drive shaft 210 is connected to the door handle 100, and the other end thereof passes through the rotary head 221 and is connected to the oblique tongue drive assembly 310.

A door lock includes a door lock device according to the embodiments of the first aspect of the present disclosure.

According to the door lock device of the embodiment of the present disclosure, through such arrangement, at least some of the following effects can be achieved: it adopts a linkage mechanism to link the oblique tongue drive assembly 310 and the deadbolt drive assembly 410, so that when the user adopts a smart electronic lock, the deadbolt lock body can be maintained, and the safety factor and experience are improved. At the same time, the deadbolt mechanism and the oblique tongue mechanism are linked without additional driving components. The disclosure has a simple structure and is easy to use.

In the description of the specification, the description of the terms "one embodiment", "some embodiments", "exemplary embodiments", "examples", "specific examples", or "some examples" means that the specific feature, structure, material, or characteristic described in combination with the embodiment or example is included in at least one embodiment or example of the present disclosure. In this specification, the schematic representations of the above-mentioned terms do not necessarily refer to the same embodiment or example. Moreover, the described specific features, structures, materials, or characteristics can be combined in any one or more embodiments or examples in a suitable manner.

Although the embodiments of the present disclosure have been shown and described, those of ordinary skill in the art can understand that various changes, modifications, substitutions, and modifications can be made to these embodiments without departing from the principle and purpose of the present disclosure. The scope of the present disclosure is defined only by the claims and equivalents.

The invention claimed is:

1. A door lock device, comprising:

a switch mechanism capable of being operatively switched from a first position to a second position or a third position;

an oblique tongue mechanism, including an oblique tongue body and an oblique tongue drive assembly, the oblique tongue drive assembly being connected to the switch mechanism, wherein, when the switch mechanism is in the first position, the oblique tongue body is in an extended state, when the switch mechanism is switched from the first position to the second position, the switch mechanism drives the oblique tongue drive assembly to drive the oblique tongue body to be in a retracted state, and when the switch mechanism is switched from the first to the third position, the switch mechanism drives the oblique tongue drive assembly to drive the oblique tongue body to be in the retracted state;

a deadbolt mechanism, including a deadbolt body and a deadbolt drive assembly; and a linkage mechanism connecting the switch mechanism and the deadbolt drive assembly, wherein, when the switch mechanism is switched from the first position to the second position and the deadbolt body is in the retracted state, the linkage mechanism is adapted to cooperate with the deadbolt drive assembly to drive the deadbolt body to be in the extended state;

when the switch mechanism is switched from the first position to the third position and the deadbolt body is in the extended state, the linkage mechanism is adapted to cooperate with the deadbolt drive assembly to drive the deadbolt body to be in the retracted state; and when the switch mechanism is switched from the second position or the third position to the first position, the linkage mechanism is disengaged from the deadbolt drive assembly.

2. The door lock device of claim 1, wherein the linkage mechanism includes:

a first gear;

a rotary head disposed in a movable cavity of the first gear, and capable of rotating within the movable cavity in a preset range;

a first drive shaft, one end of which is connected to the switch mechanism, and the other end thereof passes through the rotary head to connect with the oblique tongue drive assembly;

a second gear;

a rack, one end of which meshes with the first gear, and the other end thereof meshes with the second gear; and a second drive shaft, one end of which is connected to the second gear, and the other end thereof is connected to the deadbolt drive assembly.

3. The door lock device of claim 2, wherein the movable cavity includes a pair of radially symmetric first movable sub-cavities and a pair of radially symmetric second movable sub-cavities; each first movable sub-cavity includes a first planar inner wall, a second planar inner wall, and an arc-shaped inner wall connecting the first planar inner wall and the second planar inner wall, which are sequentially arranged in a clockwise direction; each second movable sub-cavity includes a first planar inner wall, a second planar inner wall, and an arc-shaped inner wall connecting the first planar inner wall and the second planar inner wall, which are sequentially arranged in a clockwise direction; the first planar inner wall of each first movable sub-cavity is connected to the second planar inner wall of an adjacent second movable sub-cavity upon defining a first obtuse angle therebetween, the second planar inner wall of the first movable sub-cavity is connected to the first planar inner wall of an adjacent second movable sub-cavity upon defining a second obtuse angle therebetween, and the first obtuse angle is the same as the second obtuse angle; the first planar inner wall of each first movable sub-cavity is parallel to the first planar inner wall of the other first movable sub-cavity, the second plane inner wall of each first movable sub-cavity is parallel to the second plane inner wall of the other first movable sub-cavity, the first planar inner wall of each second movable sub-cavity is parallel to the first planar inner wall of the other second movable sub-cavity, and the second planar inner wall of each second movable sub-cavity is parallel to the second planar inner wall of the other second movable sub-cavity; the rotary head is configured to: four outer walls of the rotary head respectively are pressed against two second planar inner walls of the two first movable sub-cavities and two second planar inner walls of the two second movable sub-cavities; when the rotary head rotates in the clockwise direction, the four outer walls of the rotary head respectively rotate in the clockwise direction to generate thrust on the corresponding four second planar inner walls, to drive the first gear and the rotary head to rotate synchronously at a certain angle; when the rotary head rotates in a counter clockwise direction, the rotary head is out of contact with the two second planar inner walls of the two first movable sub-cavities and the two second planar inner walls of the two second movable sub-cavities, the rotary head rotates in the counter clockwise direction relative to the first gear, and during the rotation, after the four outer walls of the rotary head are pressed against the corresponding four first planar inner walls respectively, the above-mentioned relative rotation is stopped.

4. The door lock device of claim 2, further comprising:

a first return block coaxially fixed to the second gear and provided with a first protrusion; and a first pushing plate elastically pressed against the first protrusion;

wherein, when the deadbolt body is in the extended state, the first protrusion is pressed by the first pushing plate to be in a first holding position, and when the deadbolt body is in the retracted state, the first protrusion is pressed by the first pushing plate to be in a second holding position.

5. The door lock device of claim 4, wherein the first protrusion has two intersecting first pressing surfaces, and the first pushing plate has a first pushing surface that cooperates with the first pressing surfaces.

6. The door lock device of claim 5, further comprising:

a second pushing plate;

a third gear meshed with the rack; and a second return block coaxially fixed to the third gear, wherein, the second return block is provided with a second protrusion, and the second push plate elastically presses the second protrusion; the second protrusion has two intersecting second pressing surfaces, and the second pushing plate has a second pushing surface that is matched with the second pressing surfaces;

when the deadbolt body is in the extended state, the second protrusion is pressed by the second pushing plate to be in a third holding position; and when the deadbolt body is in the retracted state, the second protrusion is pressed by the second pushing plate to be in a fourth holding position.

7. The door lock device of claim 6, wherein one end of the first pushing plate facing away from the first pushing surface is connected to a first holding spring, and one end of the second pushing plate facing away from the second pushing surface is connected to a second holding spring.

8. The door lock device of claim 1, further comprising a housing which covers the linkage mechanism and is fixed to a door panel by screws.

9. The door lock device of claim 1, wherein the switch mechanism is a door handle, one end of the first drive shaft is connected to the door handle, and the other end thereof passes through the rotary head and is connected to the oblique tongue drive assembly.

10. A door lock comprising the door lock device of claim 1.

* * * * *